Sept. 27, 1955    J. E. PILLAR    2,719,020
RESILIENT CONTROL VALVE
Filed Nov. 21, 1950

INVENTOR.
JOHN E. PILLAR
BY

United States Patent Office 2,719,020
Patented Sept. 27, 1955

2,719,020

RESILIENT CONTROL VALVE

John E. Pillar, Fairport Harbor, Ohio

Application November 21, 1950, Serial No. 196,836

3 Claims. (Cl. 251—4)

This invention relates to valves for interrupting the flow of fluid through a conduit and more particularly relates to a valve for the interruption of a flow of a fluid corrosive to metal and other common materials for structure of valves and the like.

Where materials of a very corrosive nature, such as liquids of the type of strong acids, are being conducted through a conduit, the problem of interrupting the flow thereof or modifying the flow thereof through the conduit by a valve or the like has been a serious one. Ordinary metallic valves usually will not do at all, due to the corrosion of the metal by the acid or similar fluid flowing through the conduit. Valves of plastic substances which bring into contact with the flowing fluids no materials which can be corroded thereby have been proposed, but these are ordinarily of an extremely complex character and, in addition, are highly expensive and subject to inordinate wear, whereby their use in service has been unsatisfactory.

It is an object of the present invention to provide a valve for the interruption of the flow of a corrosive fluid through a conduit, which valve shall be inexpensive and give long life in service.

It is a further object of the invention to provide a valve for the interruption of flow of fluids through a conduit which shall bring in contact with the fluids only materials completely chemically inert thereto, whereby no corrosion problem obtains.

It is an object of the invention to provide a valve for the interruption of flow of corrosive fluids in which the valving mechanism consists principally of a resilient mass of inert material having a passageway therethrough, which mass is adapted to be compressed to close said passageway and thus interrupt the flow of fluid therethrough.

It is a further object of the invention to provide a valve for the interruption of flow particularly of liquids and especially for corrosive liquids, wherein the valving mechanism comprises a sphere of resilient material of the nature of rubber having a passageway formed therethrough, which sphere is provided with instrumentalities for compressing the same, whereby the passageway may be made smaller to regulate the amount of liquid flowing therethrough or shut off completely to close the flow.

A further object is to provide such a valve in which the part thereof most subject to attrition and wear, either from movement or contact with the materials to be valved, shall be inexpensive and easily replaced.

Figure 1:
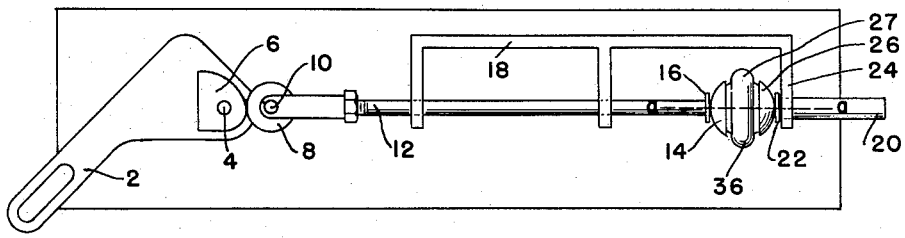
Figure 2:
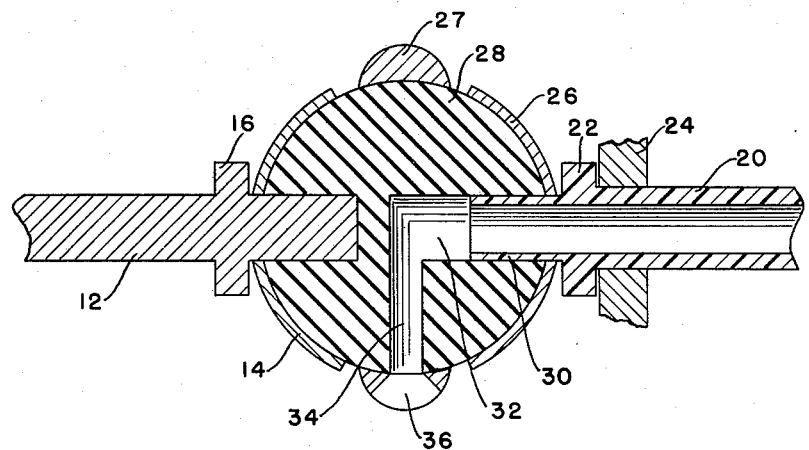

Further objects and advantages of the invention will appear from a detailed description of a preferred embodiment thereof, which follows, and which includes the drawings in which, Fig. 1 is an assembly of a valve mechanism including the improvement of this invention, and Fig. 2 is a section taken on the line a—a of Fig. 1, indicating details of a specific embodiment of the valve structure.

Referring to the drawings, in Fig. 1 is illustrated an example of the valve of this invention particularly adapted for the control of the flow of a liquid, though it will be understood that similar instrumentalities could also be employed for control of other fluids such as gases. The structure shown in Fig. 1 includes a conventional linkage for actuating a valve, which forms no part of the present invention but is shown merely to illustrate an environment in which the present invention may be employed. Thus, there is shown the operating lever 2, which may be actuated by hand or mechanically, as desired, and which may be provided with conventional setting means not shown. Secured to the lever 2, which is pivoted as at 4, is cam surface 6, which engages the edge of disc 8, which in turn is mounted to revolve about pin 10 mounted on the end of actuating rod 12. The rod 12 has as its end remote from pin 10, spherical surface 14, which is held firmly in position by flanged member 16. It will be seen that upon the upward movement of the lever 2, the rod 12 will be actuated in a direction to the right of the lever 2 as shown in the drawing, whereby the spherical surface 14 may be provided with means for lineal movements along the axis of rod 12. Frame 18 provides support for the rod 12.

Referring more particularly to Fig. 2, conduit 20 is shown as being a portion of the line containing liquid to be valved. As noted above, normally to obtain the greatest advantages of the present invention this liquid will be of a corrosive character which cannot be carried or valved by conventional metallic equipment, though, of course, the valve of the present invention is adapted for use with any liquid, corrosive or not. Conduit 20 may suitably be of plastic or other inert material. The conduit 20 is provided with flange 22, which engages the arm 24 of frame 18 and provides a positive stop against which the assembly cannot move in a direction to the right of the drawing. Spherical surface 26 is mounted on the portion of conduit 20 which extends beyond flange 22. Resilient mass 28, which may be a sphere, such as a conventional rubber ball or any other suitable resilient chemically inert material, is permanently mounted against spherical surface 26 and is held in position thereon by the extension 30 of conduit 20. Retaining ring or band 27 may suitably surround mass 28, its axis preferably being substantially in the direction of the operating thrust on mass 28. Ring 27 is apertured as at 36 and since it is in contact with material to be valved, is suitably fashioned of inert plastic material or non-corrosive metal, such as chromium, nickel or similar corrosion-resistant alloys. Passageway 32 in resilient mass 28 into which extension 30 extends is provided and meets passageway 34 in mass 28 which is at right angles thereto and terminates at aperture 36 in ring 27, whereby the passageway for passage of liquids through the valve comprises the conduit 20, the extension 30, passageways 32 and 34, and aperture 36 in ring 27.

In operation, the lever 2 is actuated and moves rod 12 in a direction to the right in the drawing, rod 12 actuating spherical surface 14 to compress the mass 28 and thus tend to close the passageway therethrough, particularly passageway 34. Ring 27 by supporting the mass or ball 28 assures that deformation thereof will not occur substantially outside of the spherical space originally defined by ball 28 but rather will occur in passages 32 and 34 rather than by displacement of the mass as a whole. It will be observed that this passageway need not be completely closed but may be partially closed to deliver a metered amount of liquid therethrough.

A particular advantage of the present invention lies in the fact that the only part of the structure which is subject to serious wear as to erosion from flowing fluids is the inexpensive and easily replaceable mass 28, which may be a simple solid rubber ball.

The present invention is particularly adapted for the delivery of a desired amount, usually in small volumes, of highly corrosive strong acids which, even in dilute solution, are ruinous to ordinary metallic type valves, a particularly useful application of the present valve is in delivering a metered amount of dilute acid, such as sulfuric acid, to boiler water for pH adjustment. Other uses and applications of the present invention in delivering particularly small amounts of highly corrosive fluid materials both liquid and gaseous will occur to those skilled in the art.

While there has been illustrated and described in detail an embodiment of the invention, the described structure is not intended to be understood as limiting the scope of the invention as it is realized that changes therewithin are possible and it is further intended that each element or instrumentality recited in any of the following claims is to be understood as referring to all equivalent elements or instrumentalities for accomplishing substantially the same results in substantially the same or equivalent manner, it being intended to cover the invention broadly in whatever form its principle may be utilized.

What is claimed is:

1. A valve for the interruption of the flow of a fluid including a mass of resilient material having a flow passage therethrough, a fixed housing mounting said mass and having a surface complementary to said mass and engaging less than one-half of said mass, said housing having a conduit therethrough for passage of fluid and said conduit being in communication with said passage in said mass, a movable housing having a surface complementary to a portion of said mass not engaged by said mounting housing and said surface engaging said portion, and movable to compress said portion, support means engaging said mass at portions of the surface thereof not engaged by said housings, and mounted to insure that upon said movable housing compressing said mass, said flow passage shall be substantially confined and thus constricted to modify flow of fluid therethrough, said movable and stationary housing being mounted to be out of contact with fluid to be valved at all times.

2. A valve for the interruption of flow of a fluid including a substantially spherically shaped mass of resilient material having a flow passage therethrough, a fixed housing mounting said sphere comprising a spherical surface of substantially the radius of said sphere, said housing having a conduit therethrough for passage of fluid, in communication with said flow passage in said sphere, a movable housing positioned to act against said sphere to compress the same and constrict said flow passage, and a rigid support for said sphere mounted in contact with the surface thereof and independent of said housings, said housings and said support substantially confining said sphere and insuring that the movement of said movable housing against said sphere will constrict said passage and thus reduce or stop fluid flow, said movable and stationary housing being mounted to be out of contact with fluid to be valved at all times.

3. A valve as claimed in claim 2 wherein said support is apertured for passage of fluid therethrough and is in communication with said flow passage.

References Cited in the file of this patent

UNITED STATES PATENTS

| | | |
|---|---|---|
| 1,024,876 | Barbour | Apr. 30, 1912 |
| 1,657,663 | Devereux | Jan. 31, 1928 |
| 2,099,841 | Connell | Nov. 23, 1937 |
| 2,338,759 | Fortune | Jan. 11, 1944 |

FOREIGN PATENTS

| | | |
|---|---|---|
| 355,675 | Germany | 1922 |
| 222,794 | Great Britain | 1924 |
| 668,809 | France | 1929 |